US010260482B2

(12) United States Patent
Ohlerich

(10) Patent No.: US 10,260,482 B2
(45) Date of Patent: Apr. 16, 2019

(54) WIND TURBINE ROTOR BLADE HAVING A SPARK GAP

(71) Applicant: Nordex Energy GmbH, Hamburg (DE)

(72) Inventor: Nick Ohlerich, Rostock (DE)

(73) Assignee: Nordex Energy GmbH, Hamburg (DE)

( * ) Notice: Subject to any disclaimer, the term of this patent is extended or adjusted under 35 U.S.C. 154(b) by 309 days.

(21) Appl. No.: 15/226,465

(22) Filed: Aug. 2, 2016

(65) Prior Publication Data

US 2017/0045036 A1 Feb. 16, 2017

(30) Foreign Application Priority Data

Aug. 10, 2015 (EP) .................................... 15180404

(51) Int. Cl.
*F03D 80/30* (2016.01)
*F03D 80/40* (2016.01)
*F03D 1/06* (2006.01)

(52) U.S. Cl.
CPC ........... *F03D 80/30* (2016.05); *F03D 1/0675* (2013.01); *F03D 80/40* (2016.05); *F05B 2220/30* (2013.01); *F05B 2240/21* (2013.01); *Y02E 10/721* (2013.01)

(58) Field of Classification Search
CPC ............................... F03D 80/30; F03D 1/0675
See application file for complete search history.

(56) References Cited

U.S. PATENT DOCUMENTS

| | | | | |
|---|---|---|---|---|
| 6,612,810 B1* | 9/2003 | Olsen | ...................... | F03D 80/40 415/4.5 |
| 9,816,482 B2* | 11/2017 | Caruso | .................. | F03D 1/0675 |
| 2013/0280073 A1* | 10/2013 | Erichsen | .............. | F03D 1/0675 416/146 R |
| 2014/0348654 A1* | 11/2014 | Klein | ...................... | F03D 80/30 416/95 |
| 2015/0204311 A1* | 7/2015 | Clemens | ............. | F03D 11/0025 361/118 |

FOREIGN PATENT DOCUMENTS

DE 10 2005 045 579 A1 3/2007

* cited by examiner

*Primary Examiner* — Woody A Lee, Jr.
(74) *Attorney, Agent, or Firm* — Walter Ottesen, P.A.

(57) ABSTRACT

A wind turbine rotor blade is provided. The wind turbine rotor blade has a lightning receptor, a first electrical line and a potential equalization arrangement which has a first electrode, which is connected to the lightning receptor, and a second electrode, which is connected to the first electrical line, a spark gap being formed between the two electrodes. The two electrodes are arranged on an outer side of the wind turbine rotor blade and are exposed to the surrounding air flow.

13 Claims, 2 Drawing Sheets

WIND TURBINE ROTOR BLADE HAVING A SPARK GAP

CROSS REFERENCE TO RELATED APPLICATION

This application claims priority of European patent application no. 15180404.4, filed Aug. 10, 2015, the entire content of which is incorporated herein by reference.

FIELD OF THE INVENTION

The invention relates to a wind turbine rotor blade having a lightning receptor, a first electrical line and a potential equalization arrangement which has a first electrode, which is connected to the lightning receptor, and a second electrode, which is connected to the first electrical line, a spark gap being formed between the two electrodes.

BACKGROUND OF THE INVENTION

It is known to use a lightning protection arrangement to protect wind turbine rotor blades against damage by a lightning strike. For this purpose, a lightning receptor is generally arranged in the region of the blade tip. The current of lightning striking into the lightning receptor is then diverted, via a lightning conductor, toward the blade root, and from there, via the nacelle and the tower of the wind turbine, into the ground. If a plurality of electrically conductive elements are arranged, more or less in parallel, in the wind turbine rotor blade, electromagnetic induction in the case of a lightning strike causes large potential differences between the electrically conductive elements and the potential differences can lead to flashovers or even to the destruction of the wind turbine rotor blade. It is known to counteract flashovers of this kind using potential equalization elements.

Potential equalization of this kind is necessary, in particular, if one of the electrically conductive elements is an electric heating device for de-icing the surface of the wind turbine rotor blade. These heating devices are provided with a power supply and have to be electrically isolated from the lightning protection system during operation. For this purpose, spark gaps may be provided in the interior of the rotor blade, between the heating device and the lightning protection arrangement, as shown in U.S. Pat. No. 6,612,810. In the event of a lightning strike, these spark gaps are bridged and establish potential equalization between the heating device and the lightning protection arrangement.

United States patent application publication 2015/0204311 shows a wind turbine rotor blade having an electrical heating device and a lightning conductor. The heating device and the lightning conductor are connected to one another at several points over the length of the rotor blade, via spark gaps. The spark gaps are arranged in the interior of the rotor blade, in combination with the lightning receptors.

In order to ensure the operational reliability of the lightning protection arrangement, the functional performance of the spark gaps must be checked regularly. In this case, in particular, spark gaps which are arranged in the blade tip region are accessible only with a great deal of difficulty.

SUMMARY OF THE INVENTION

It is an object of the invention to provide a wind turbine rotor blade having a potential equalization arrangement which can more easily be kept in an operationally reliable state.

The object is achieved by providing a wind turbine rotor blade including a potential equalization arrangement having a first electrode, a second electrode and a spark gap; the spark gap being formed between the first and second electrodes; a lightning receptor connected to the first electrode; an electrical line connected to the second electrode; an outer side; the first and second electrodes being arranged on the outer side; and, the first and second electrodes being exposed to an air flow surrounding the wind turbine rotor blade.

The wind turbine rotor blade has a lightning receptor, a first electrical line and a potential equalization arrangement which has a first electrode, which is connected to the lightning receptor, and a second electrode, which is connected to the first electrical line, a spark gap being formed between the two electrodes and the two electrodes being arranged on an outer side of the wind turbine rotor blade and being exposed to the surrounding air flow.

The lightning receptor can be arranged, in particular, at or close to a blade tip of the wind turbine rotor blade, but also at a greater distance therefrom, even in combination with one or more further lightning receptors. The lightning receptor is generally composed of metal, for example of copper or aluminum, and offers an exposed surface on the outer side of the wind turbine rotor blade, into which lightning can strike.

The first electrical line may be a lightning conductor or another electrical line, for example a supply line, by which electrical energy can be supplied to an electric load which is arranged in or on the wind turbine rotor blade, or a signal line, via which electrical signals can be transmitted, for example, from a sensor which is arranged in or on the wind turbine rotor blade. The first electrical line may be dimensioned such that, in the event of a lightning strike in which potential equalization is effected by the spark gap, the first electrical line can wholly or partially carry a lightning current, in particular to the blade root. In this sense, the first electrical line may be a lightning conductor, even if the first electrical line fulfills a different function during normal operation of the wind turbine rotor blade. The first electrical line is electrically isolated from the lightning receptor. Potential equalization is effected by the spark gap only in the event of a lightning strike.

The connection of the first electrode to the lightning receptor and/or the connection of the second electrode to the first electrical line may be an indirect or direct connection. For example, this connection may include a rigid electrical conductor, a more or less flexible cable and/or a screwed connection.

The two electrodes are preferably solid metal parts, in particular composed of copper. The two electrodes are arranged at a distance from one another, the distance being dimensioned such that, in the case of the high potential differences that occur in the event of a lightning strike, a flashover occurs, the distance simultaneously ensuring sufficient electrical insulation for the potential differences which occur during normal operation of the wind turbine rotor blade. Typically, the distance between the two electrodes may be in the order of magnitude of approximately one or several centimeters.

In one embodiment, the two electrodes are arranged on an outer side of the wind turbine rotor blade and are exposed to the surrounding air flow. An important advantage of this external arrangement of the electrodes is that they are readily accessible from the outside for servicing and repair work. Furthermore, the air flow can reach, in particular, the free space between the two electrodes and prevent moisture or particles accumulating.

In one embodiment, the wind turbine rotor blade has a busbar which forms a current path from a pressure side of the wind turbine rotor blade to a suction side of the wind turbine rotor blade, the two electrodes being integrated into the current path and the current path being interrupted by the spark gap. Busbars as potential equalization elements are known. They are distinguished by a robust configuration and a high current-carrying capacity. If the busbar is intended to establish potential equalization between conductors which are arranged on different sides of the wind turbine rotor blade (pressure side/suction side), the busbar can be arranged, in particular, on the outer side of the wind turbine rotor blade. This allows the busbar to be mounted after the rotor blade is largely complete, in particular after two half-shells are joined together. The two conductors are connected to one another by the busbar and are integrated into the two half-shells. In accordance with an aspect of the invention, the spark gap is integrated into the busbar, which allows a particularly compact arrangement.

In one embodiment, the busbar is arranged substantially in the direction of an air flow which flows around the wind turbine rotor blade during operation. This is advantageous in respect of aerodynamics.

In one embodiment, the busbar is routed around a profile trailing edge of the wind turbine rotor blade. As a result, undesirable interactions between the busbar and an electrical heating device, which is arranged substantially in the region of the profile leading edge, can be avoided.

In one embodiment, the busbar has a first section with a first end which forms the first electrode and with a second end which is connected to the lightning receptor. The busbar has a second section with a first end, which forms the second electrode, and with a second end, which is connected to the first electrical line. The spark gap is arranged between the two electrodes. The two second ends can be routed directly as far as the conductors between which the busbar is intended to allow potential equalization and can be connected to the conductors, or can end at a distance from the conductors and can be connected to the conductors indirectly, for example by cables.

In one embodiment, the first section or the second section has an elongate hole with the aid of which the section is fastened to the wind turbine rotor blade and which allows the distance between the two electrodes to be adjusted. The length of the spark gap can be adjusted in a targeted manner in this way. The electrical connection of the first section or of the second section at its second end can be established, in particular, with the aid of a threaded bolt which is inserted into the elongate hole, so that the elongate hole simultaneously allows simple fastening to the wind turbine rotor blade and reliable electrical connection.

In one embodiment, the first section or the second section is routed around the profile trailing edge of the wind turbine rotor blade. In this way, the busbar allows potential equalization between the pressure side and suction side.

In one embodiment, the first end of the first section tapers to a point in the direction of the first end of the second section and/or vice versa. The term "and/or vice versa" means that, as an alternative or in addition, the first end of the second section can taper to a point in the direction of the first end of the first section. Therefore, saying that the end in question tapers to a point means that, in particular, its width narrows in the direction, wherein the tip can be rounded to a greater or lesser extent. A geometry of this kind of one or both of the electrodes leads to the formation of the spark gap in a clearly defined region.

In one embodiment, a surface region on the outer side of the wind turbine rotor blade in which the two electrodes are arranged is provided with a heat-resistant coating. When the spark gap is ignited, the coating serves as a protective layer for the material of the rotor blade shell (for example a glass fiber laminate) and can be composed of ceramic or Teflon for example.

In one embodiment, the wind turbine rotor blade has an electrical heating device, and the first electrical line is a supply line via which the electrical heating device can be supplied with a heating current. In this case, the electrical isolation between the first electrical line and the lightning receptor which is generally connected to ground by a lightning conductor allows current to be supplied to the heating device in a reliable manner. At the same time, damage to the supply line or to the electrical heating device is prevented by the potential equalization which occurs in the event of a lightning strike.

In one embodiment, the wind turbine rotor blade has a lightning conductor which is connected to the lightning receptor and leads to a blade root. The lightning conductor is a second electrical line and, like the first electrical line too, may optionally fulfill an additional function, for example as a supply or signal line. To this end, the lightning conductor can be electrically isolated from ground potential as necessary, for example using a further spark gap or another surge arrestor.

BRIEF DESCRIPTION OF THE DRAWINGS

The invention will now be described with reference to the drawings wherein.

DESCRIPTION OF THE PREFERRED
EMBODIMENTS OF THE INVENTION

All figures are schematic illustrations and use the same reference symbols for mutually corresponding elements.

Figure 1:
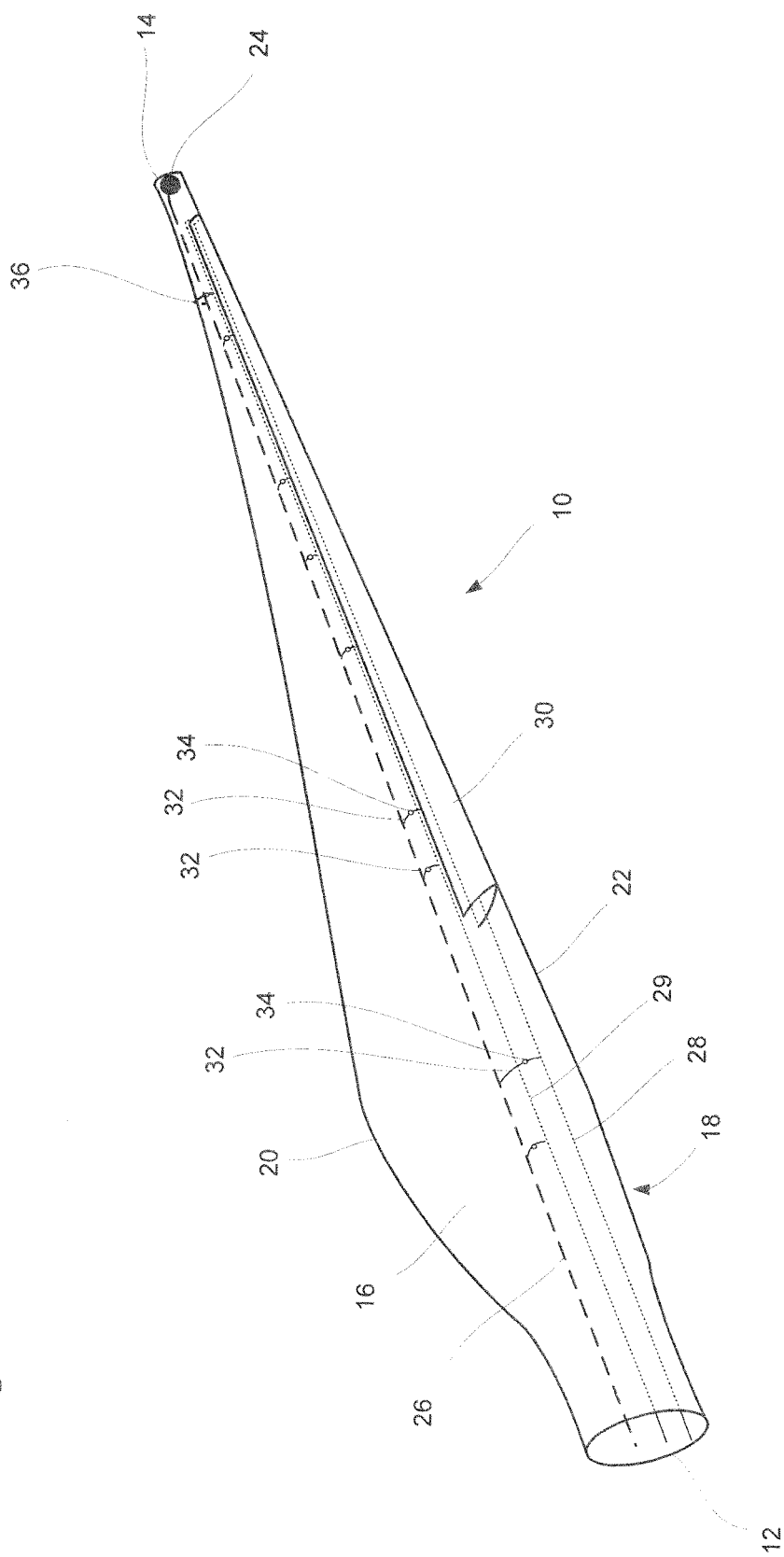
FIG. 1 is a simplified, perspective illustration of a rotor blade.

FIG. 1 shows a wind turbine rotor blade 10 which has an electric heating device 30. Wind turbine blades are generally known in the prior art. The wind turbine rotor blade 10 has a blade root 12 and a blade tip 14. In FIG. 1, the view is directed substantially toward the pressure side 16. The wind turbine rotor blade 10 has a suction side 18 on the side facing away from the viewer.

The wind turbine rotor blade 10 has a profile trailing edge 20 and a profile leading edge 22. A lightning receptor 24 is arranged in the region of the blade tip 14. The lightning receptor 24 is connected in an electrically conductive manner to a lightning conductor 26 which is indicated by a dashed line. The current of a lightning strike into the lightning receptor 24 can be diverted in the direction of the blade root 12 via the lightning conductor 26.

The wind turbine rotor blade 10 has an electric heating device 30, through which current flows in the longitudinal direction and which, at the blade root end of the rotor blade and at the blade tip end of the rotor blade, is in each case connected to a power supply cable 28, 29. Potential equalization connections 32, which each have an interposed spark gap 34, are located between the heating device 30 and the lightning conductor 26, and between the power supply cables 28, 29 and the lightning conductor 26. A potential equalization device according to an embodiment of the invention which is situated on the surface of the rotor blade and which is in the form of a busbar 36 with two electrodes, between which a spark gap is located, is arranged in the region of the rotor blade tip. During normal operation, the heating device 30 and the lightning conductor 26 are electrically isolated from one another, in order to prevent the heating current from flowing away via the lightning conductor 26. In the event of a lightning strike, the spark gaps 34 are ignited by the lightning current, and potential equalization is effected between the parallel conductors.

Figure 2:
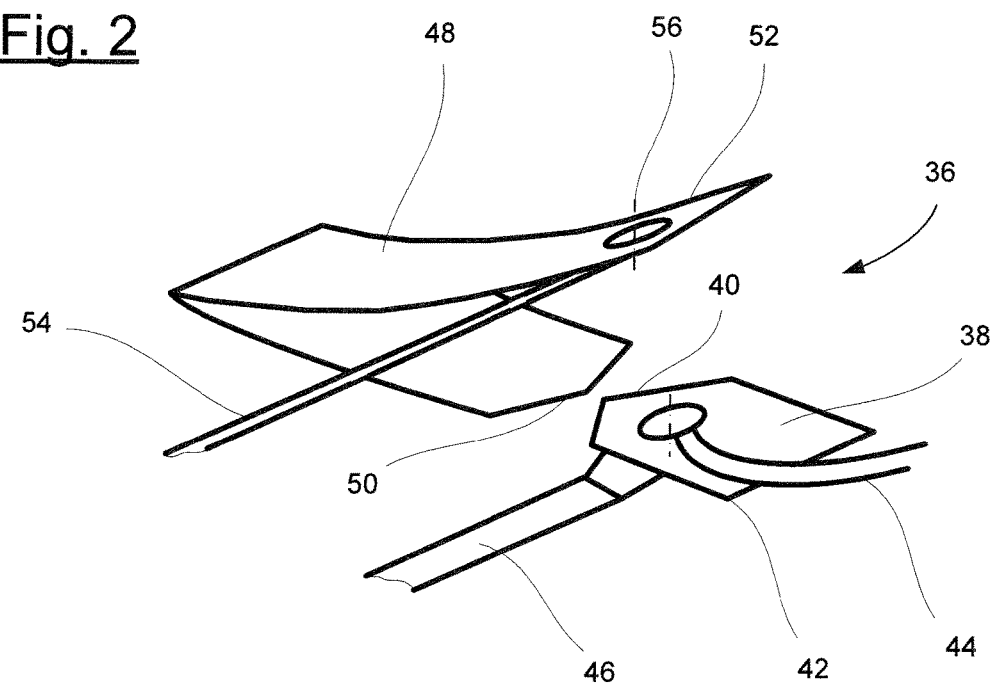
FIG. 2 is a perspective illustration of a busbar for a wind turbine rotor blade according to an embodiment of the invention; and, FIG. 3 is a perspective illustration of another busbar for a wind turbine rotor blade according to an embodiment of the invention.

FIG. 2 illustrates a busbar 36 in a position in which it is fastened to a wind turbine rotor blade 10 according to an embodiment of the invention. The wind turbine rotor blade 10 itself is omitted from FIG. 2.

The busbar 36 has a first section 38. A first end 40 of the first section forms the first electrode. A second end 42 of the first section 38 is connected to a lightning receptor 24, not illustrated in FIG. 2, specifically by cable 44. A lightning conductor 46, which leads to the blade root 12, is likewise connected to the first section 38 of the busbar 36.

The busbar 36 also has a second section 48 which has a first end 50 which forms the second electrode, and a second end 52 which is connected to a first electrical conductor 54, specifically by a bolt 56 which is routed through the rotor blade shell, not illustrated, and indicated by a dash-and-dot line.

During normal operation of the wind turbine rotor blade, the first electrical conductor 54 fulfills a function as a supply line for the electric heating device 30, not illustrated in FIG. 2. In the event of a lightning strike, the first electrical conductor 54 additionally acts as a lightning conductor and can divert some of the lightning current to the blade root 12.

The first end 40 of the first section 38 of the busbar 36 tapers to a point in the direction of the first end 50 of the second section 48 of the busbar 36. The first end 50 of the second section 48 of the busbar 36 likewise tapers to a point in the direction of the first end 40 of the first section 38 of the busbar 36, so that a region of a smallest distance between the two electrodes which are formed by the two first ends 40, 50 is spatially precisely defined.

Figure 3:
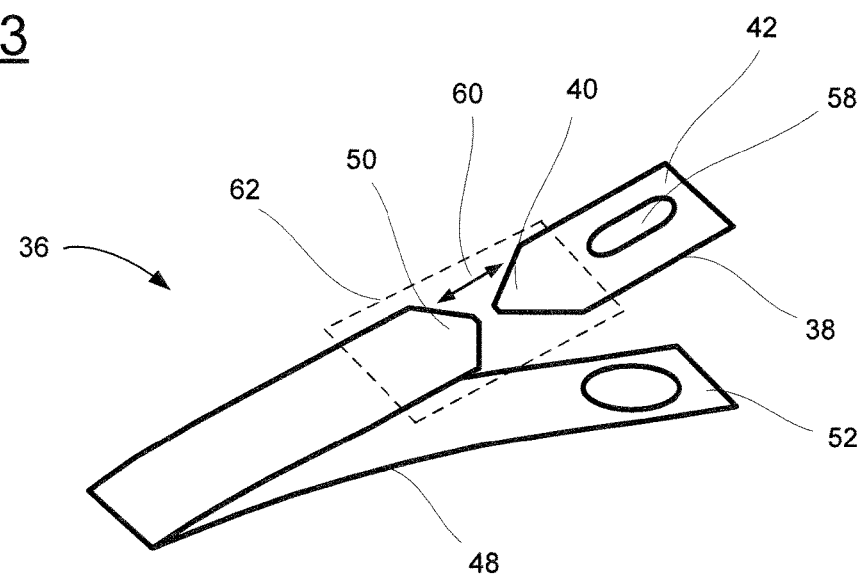

FIG. 3 shows a further embodiment of a busbar 36, which is divided into two, for a wind turbine rotor blade 10 according to the invention. The figure shows only the first section 38 and the second section 48 of the busbar 36. The figure clearly shows an elongate hole 58 which is formed in the first section 38 and runs in the longitudinal direction of the first section 38 of the busbar 36 and allows the first section 38 to be fastened to the wind turbine rotor blade 10 in a different position, so that the length of the spark gap between the two sections 38, 48 of the busbar 36 can be adjusted in a targeted manner, as illustrated by the arrow 60.

A surface region 62 of the wind turbine rotor blade 10, not illustrated, in which a heat-resistant coating is applied to the wind turbine rotor blade is indicated using dashed lines. The two electrodes are located in the surface region 62.

It is understood that the foregoing description is that of the preferred embodiments of the invention and that various changes and modifications may be made thereto without departing from the spirit and scope of the invention as defined in the appended claims.

LIST OF REFERENCE NUMERALS

10 Wind turbine rotor blade
12 Blade root
14 Blade tip
16 Pressure side
18 Suction side
20 Profile trailing edge
22 Profile leading edge
24 Lightning receptor
26 Lightning conductor
28 Power supply cable
29 Power supply cable
30 Heating device
32 Potential equalization connection
34 Spark gap
36 Busbar
38 First section of the busbar 36
40 First end of the first section 38
42 Second end of the first section 38
44 Cable
46 Lightning conductor
48 Second section of the busbar 36
50 First end of the second section 48
52 Second end of the second section 48
54 First electrical line
56 Bolt
58 Elongate hole
60 Arrow
62 Surface region with coating

What is claimed is:

1. A wind turbine rotor blade comprising:
   a potential equalization arrangement having a first electrode, a second electrode and a spark gap;
   said spark gap being formed between said first and second electrodes;
   a lightning receptor connected to said first electrode;
   an electric line connected to said second electrode;
   an outer side;
   said first and second electrodes being arranged on said outer side;
   said first and second electrodes being exposed to an air flow surrounding the wind turbine rotor blade;
   a pressure side and a suction side;
   said potential equalization arrangement including a busbar;
   said busbar defining a current path from said pressure side to said suction side;
   said first and second electrodes being integrated into said current path; and,
   said current path being interrupted by said spark gap.

2. The wind turbine rotor blade of claim 1, wherein said busbar is arranged substantially in a direction of said air flow surrounding the wind turbine rotor blade as the wind turbine rotor blade is in operation.

3. The wind turbine rotor blade of claim 1, further comprising:
   a profile trailing edge; and,
   said busbar being arranged on said profile trailing edge.

4. The wind turbine rotor blade of claim 3, wherein:
   said busbar includes a first section and a second section;
   said first section has a first end and a second end;
   said first end forms said first electrode and said second end is connected to said lightning receptor;
   said second section has a third end and a fourth end; and,
   said third end forms said second electrode and said fourth end is connected to said electrical line.

5. The wind turbine rotor blade of claim 4, wherein:
   said first section has an elongate hole;
   said first section is fastened to the wind turbine rotor blade with the aid of said elongate hole; and, said elongate hole is arranged to allow a distance between said first and second electrodes to be adjusted.

6. The wind turbine rotor blade of claim 4, wherein:
said second section has an elongate hole;
said second section is fastened to the wind turbine rotor blade with the aid of said elongate hole; and,
said elongate hole is arranged to allow a distance between said first and second electrodes to be adjusted.

7. The wind turbine rotor blade of claim 4, wherein said first section is routed around said profile trailing edge.

8. The wind turbine rotor blade of claim 4, wherein said second section is routed around said profile trailing edge.

9. The wind turbine rotor blade of claim 4, wherein said first end of said first section has a tapered tip directed towards said third end of said second section.

10. The wind turbine rotor blade of claim 4, wherein said third end of said second section has a tapered tip directed towards said first end of said first section.

11. The wind turbine rotor blade of claim 1, further comprising:
a surface region defining an area on said outer side in which the first and second electrodes are arranged; and,
said surface region being provided with a heat-resistant coating.

12. The wind turbine rotor blade of claim 1, further comprising:
an electric heating device; and,
said electric line being a supply line to supply said electric heating device with a heating current.

13. The wind turbine rotor blade of claim 1, further comprising:
a lightning conductor connected to said lightning receptor;
a blade root; and,
said lightning conductor being arranged between said lightning receptor and said blade root.

* * * * *